United States Patent
Rolla

(10) Patent No.: US 12,310,527 B2
(45) Date of Patent: May 27, 2025

(54) SYSTEM FOR TRACKING AND DISPLAYING THE POSITION OF A MOTOR VEHICLE AND OF A CONTROL METHOD FOR DISPENSING A HOT FLUID AND DEVICE FOR DISPENSING A HOT FLUID

(71) Applicant: G.B. PROGETTI S.R.L., Rivanazzano Terme (IT)

(72) Inventor: Alberto Rolla, Manciano (IT)

(73) Assignee: G.B. PROGETTI S.R.L., Rivanazzano Terme (IT)

(*) Notice: Subject to any disclaimer, the term of this patent is extended or adjusted under 35 U.S.C. 154(b) by 202 days.

(21) Appl. No.: 18/014,590

(22) PCT Filed: Jul. 7, 2021

(86) PCT No.: PCT/IB2021/056089
§ 371 (c)(1),
(2) Date: Jan. 5, 2023

(87) PCT Pub. No.: WO2022/009113
PCT Pub. Date: Jan. 13, 2022

(65) Prior Publication Data
US 2023/0255397 A1 Aug. 17, 2023

(30) Foreign Application Priority Data
Jul. 10, 2020 (IT) .................. 102020000016831

(51) Int. Cl.
*A47J 31/56* (2006.01)
*A47J 31/46* (2006.01)
(Continued)

(52) U.S. Cl.
CPC ............ *A47J 31/56* (2013.01); *A47J 31/468* (2018.08); *A47J 31/5253* (2018.08);
(Continued)

(58) Field of Classification Search
CPC ...... A47J 31/56; A47J 31/468; A47J 31/5253; A47J 31/5255; A47J 31/60; A47J 2202/00;
(Continued)

(56) References Cited

U.S. PATENT DOCUMENTS

2011/0223309 A1* 9/2011 Daburger ................ A47J 31/36
99/289 R
2016/0296065 A1* 10/2016 Doglioni Majer .. A47J 31/5253
(Continued)

FOREIGN PATENT DOCUMENTS

CN 118111129 A * 5/2024
EP 2080461 A1 * 7/2009 .............. A47J 31/56
(Continued)

OTHER PUBLICATIONS

International Search Report dated Jul. 27, 2021 from counterpart PCT App PCT/IB2021/056089.

*Primary Examiner* — Bob Zadeh
(74) *Attorney, Agent, or Firm* — SHUTTLEWORTH & INGERSOLL, PLC; Timothy J. Klima

(57) ABSTRACT

Described is a control method for dispensing a hot fluid in a fluid dispensing device, which comprises a power supply source; a source of fluid to be heated; a feed unit configured for picking up the fluid to be heated; a boiler or heat exchanger; a dispensing device configured for dispensing the hot fluid and a data control and processing system which actuates the following steps: a measurement of inlet parameters comprising at least an inlet power value and an inlet temperature of the fluid towards the boiler or heat exchanger; a cyclical calculation of a quantity of heat generated which must supply the boiler or heat exchanger and/or a quantity of fluid dispensed; consequent adjustment of the value of heat generated by the boiler or heat exchanger and/or the quantity of fluid dispensed, as a function of the
(Continued)

measurements of the inlet parameters and of a wanted or desired value of outlet temperature of the fluid; the above-mentioned measurement, cyclical calculation and adjustment steps are performed simultaneously and in real time during a step of dispensing fluid by the dispensing device.

18 Claims, 4 Drawing Sheets

(51) Int. Cl.
    *A47J 31/52*     (2006.01)
    *A47J 31/60*     (2006.01)

(52) U.S. Cl.
    CPC ........... *A47J 31/5255* (2018.08); *A47J 31/60* (2013.01); *A47J 2202/00* (2013.01)

(58) Field of Classification Search
    CPC ............ A47J 31/545; F04B 2203/0201; F04B 2203/0202; F04B 2205/09; F04B 2205/11; F04B 17/03; F04B 23/02; F04B 49/06; F04B 53/08; F04B 13/00
    See application file for complete search history.

(56) References Cited

U.S. PATENT DOCUMENTS

| | | | | |
|---|---|---|---|---|
| 2017/0303727 | A1* | 10/2017 | Kollep | ................. A47J 31/3633 |
| 2020/0008602 | A1* | 1/2020 | Guyon | ................. A47J 31/468 |
| 2023/0255397 | A1* | 8/2023 | Rolla | ................... A47J 31/468 |
| | | | | 222/1 |

FOREIGN PATENT DOCUMENTS

| | | | |
|---|---|---|---|
| EP | 2948032 | A1 | 12/2015 |
| EP | 2948032 | B1 * | 4/2018 ............ A47J 31/401 |
| EP | 3569115 | B1 | 12/2020 |
| ES | 2947185 | T3 * | 8/2023 .......... A47J 31/5253 |

\* cited by examiner

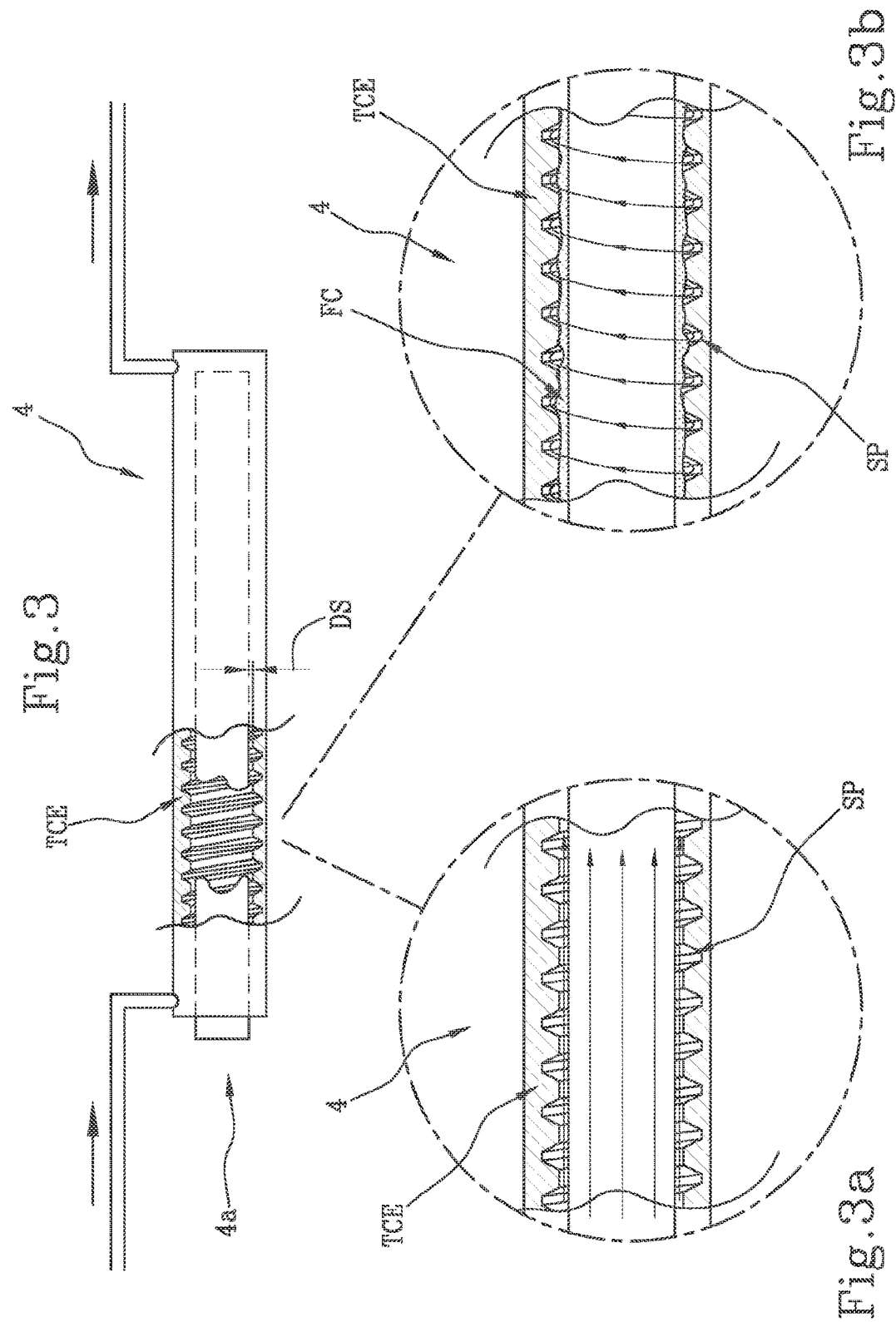

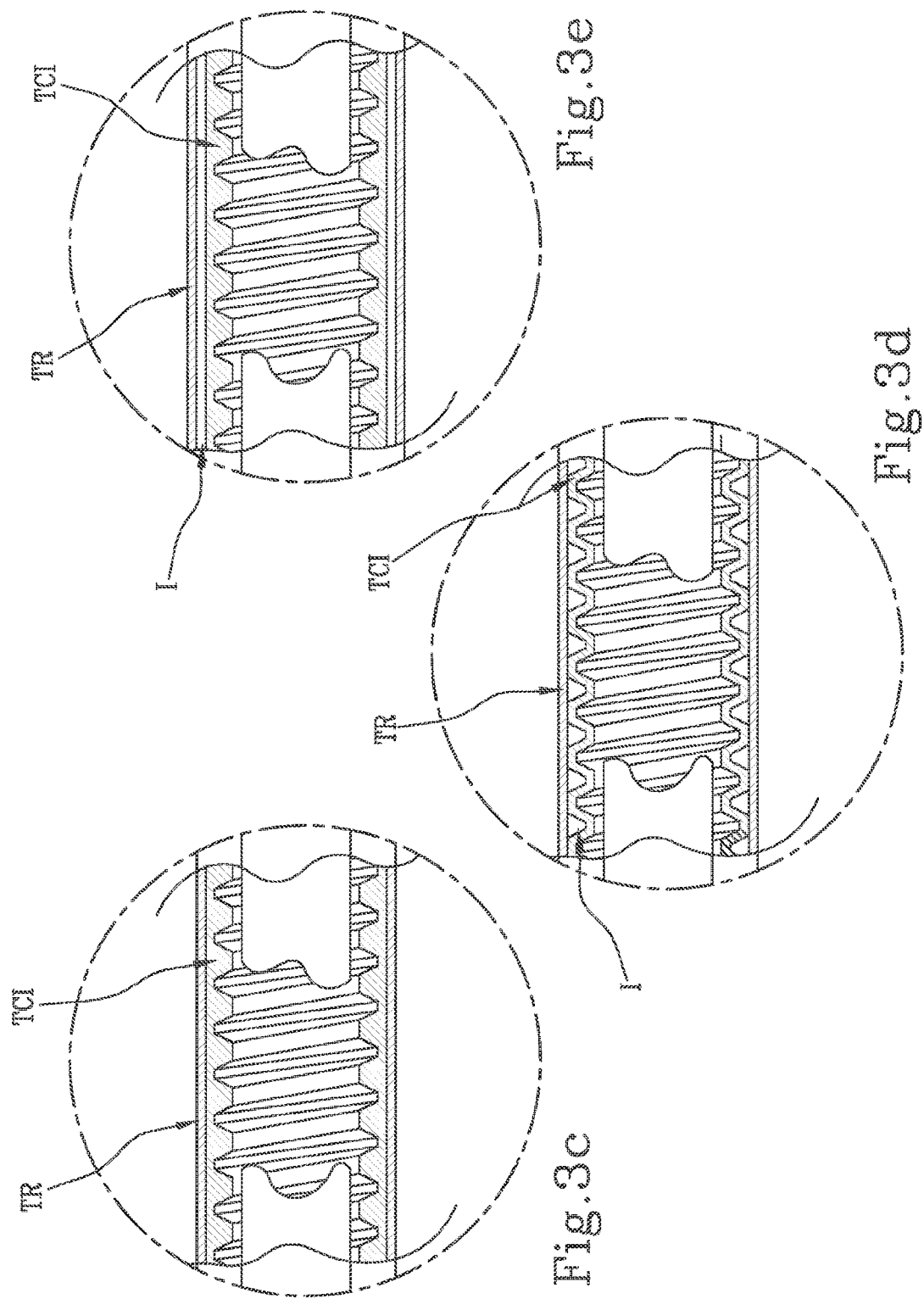

SYSTEM FOR TRACKING AND DISPLAYING THE POSITION OF A MOTOR VEHICLE AND OF A CONTROL METHOD FOR DISPENSING A HOT FLUID AND DEVICE FOR DISPENSING A HOT FLUID

This application is the National Phase of International Application PCT/IB2021/056089 filed Jul. 7, 2021 which designated the U.S.

This application claims priority to Italian Patent Application No. 102020000016831 filed Jul. 10, 2020, which applications are incorporated by reference herein.

TECHNICAL FIELD

This invention relates to a control method for dispensing a hot fluid in a dispensing device.

The invention also relates to a device for dispensing a hot fluid.

BACKGROUND ART

Currently, for example, there are various types of dispensing machines and/or dispensers for dispensing coffee or other hot beverages such as tea, camomile, herbal tea, etc. (that is to say, for dispensing hot fluids for food products), or for mixing the fluid in order to obtain food products such as soups or the like.

For convenience of description, reference will be made, in this description, to this type of dispensing machines/dispensers, but the method according to the invention and the relative device may also be used in similar sectors in which it is necessary to obtain an adjustment and a feeding of a hot fluid.

These dispensing machines require the fluid to be kept at a programmed temperature in order to dispense a hot drink with desired characteristics. The need to keep the fluid dispensed at a predetermined temperature derives from the fact that temperatures which are too low or too high could result in an unpleasant drink, with an undesired taste.

Generally speaking, such dispensing machines are equipped with a control system which adapts the operating parameters of the machine as a function of the outlet temperature detected and therefore require a certain thermal inertia to prevent sudden undesired temperature variations.

More specifically, the sudden temperature variations are due to the non-immediate response of a probe for measuring the fluid outlet temperature connected to the control system during:
  variability of the flow of fluid which can be dispensed;
  mains voltage variability;
  variability of the temperature of the fluid entering the boiler or heat exchanger of the dispensing device, etc.

In other words, the prior art systems are not able to take into account these variations and to act promptly so as to obtain the best possible result from the dispensing machine.

Thus, due both to the slow reading of the probe for measuring the temperature of the hot fluid flowing out from the boiler or heat exchanger of the dispensing device, and due to the lack of reading and control of the variables discussed previously, the prior art systems are not able to fully provide the desired results, even in terms of product quality.

DISCLOSURE OF THE INVENTION

The technical purpose of the invention is therefore to provide a control method hot fluid and a dispensing device which are able to overcome the drawbacks of the prior art.

The aim of the invention is therefore to provide a method for controlling the dispensing of a hot fluid and a device for dispensing a hot fluid which allow the parameters of the dispensing device to be precisely adjusted in such a way as to keep constant the outlet temperature of the hot fluid.

A further aim of the invention is therefore to provide a method for controlling the dispensing of a hot fluid and a dispensing device which allow a saving in terms of energy consumption, thanks to which it is possible to manage suitable heat exchangers or boilers with a very low thermal inertia, which are able to reach the desired temperature in a very short time.

Another aim of the invention is therefore to provide a method for controlling the dispensing of a hot fluid and a dispensing device which allow undesired damage to any capsule and/or to the device itself to be prevented.

The technical purpose indicated and the aims specified are substantially achieved by a method for controlling the dispensing of a hot fluid and a dispensing device comprising the technical features described in one or more of the appended claims.

The dependent claims correspond to possible embodiments of the invention.

More specifically, the technical purpose indicated and the aims specified are substantially achieved by a control method for dispensing a hot fluid in a dispensing device comprising the steps of continuously measuring, in real time, parameters, that is to say, external variables for operation of the dispensing device (such as, for example, a supply voltage, a temperature of the fluid entering the device, a quantity of fluid flow required; on the basis of these parameters, calculating and, consequently, immediately adjusting, in a preventive manner during a step of dispensing the fluid: the heat supplied by the boiler or heat exchanger of the dispensing device and/or the flow of fluid dispensed by a pump, in such a way as to keep at the desired value the outlet temperature of the fluid from the boiler or heat exchanger and thus preventing it from varying.

Moreover, the technical purpose indicated and the aims specified are substantially achieved in a fluid dispensing device comprising a fluid tank, a pump configured for drawing fluid from the tank, a boiler or heat exchanger configured for heating the fluid drawn by the pump, a nozzle configured for dispensing the heated fluid from the boiler or heat exchanger and a system for controlling the dispensing device configured to realise a method described above.

BRIEF DESCRIPTION OF DRAWINGS

Further features and advantages of the invention are more apparent in the non-limiting description which follows of a non-exclusive embodiment of a control method for the dispensing of a hot fluid and a relative device for dispensing hot fluid.

The description is set out below with reference to the accompanying drawings which are provided solely for purposes of illustration without restricting the scope of the invention and in which:

FIG. 3 is a schematic representation of a boiler or heat exchanger of the dispensing device of FIG. 2;

FIGS. 3a, 3b, 3c, 3d and 3e show corresponding scaled-up details from FIG. 3.

DETAILED DESCRIPTION OF PREFERRED EMBODIMENTS OF THE INVENTION

Figure 1:
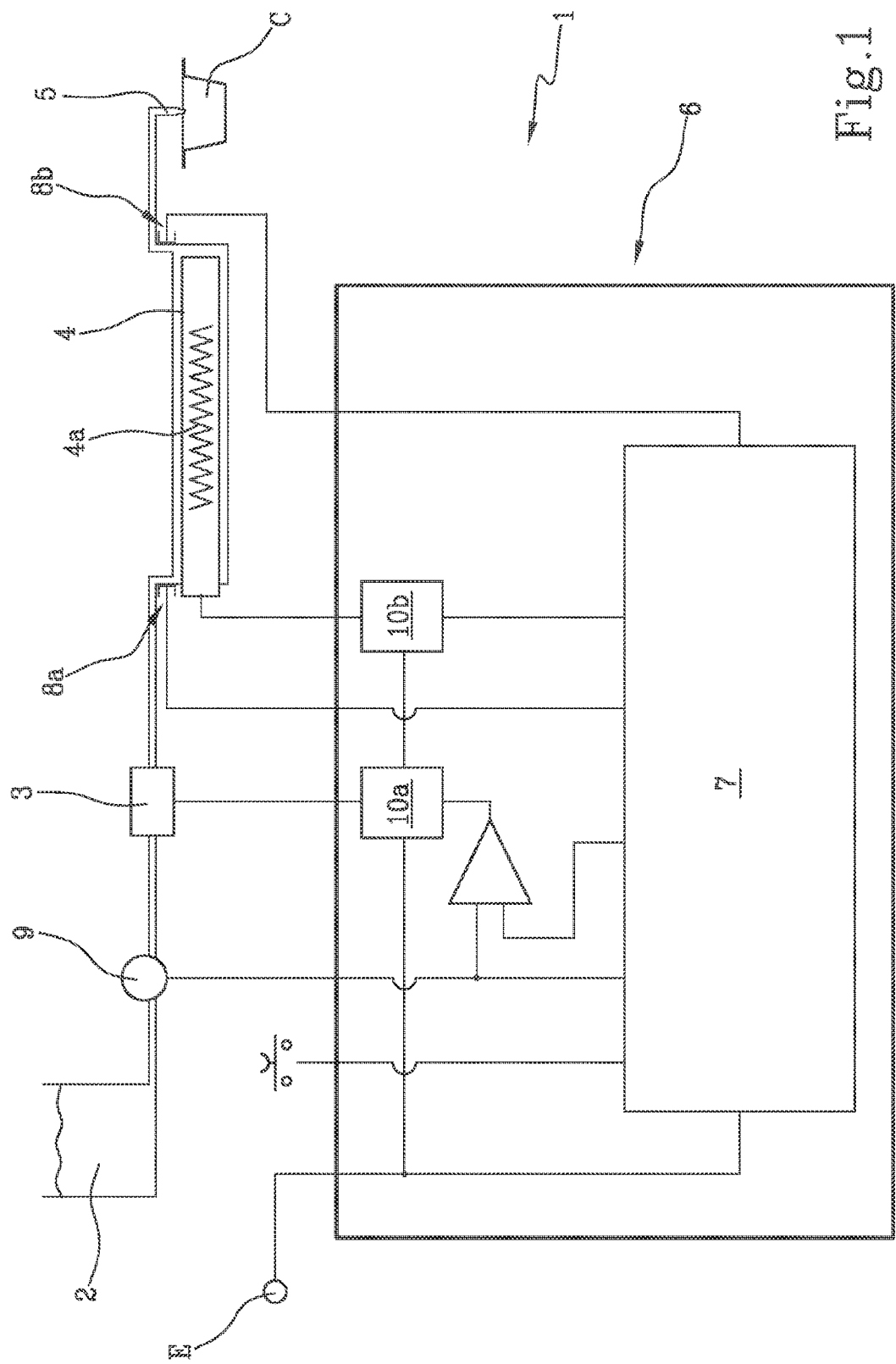
FIG. 1 is a schematic representation of a device for dispensing hot fluid which is able to process the method for controlling and dispensing a hot fluid according to the invention.
Figure 2:
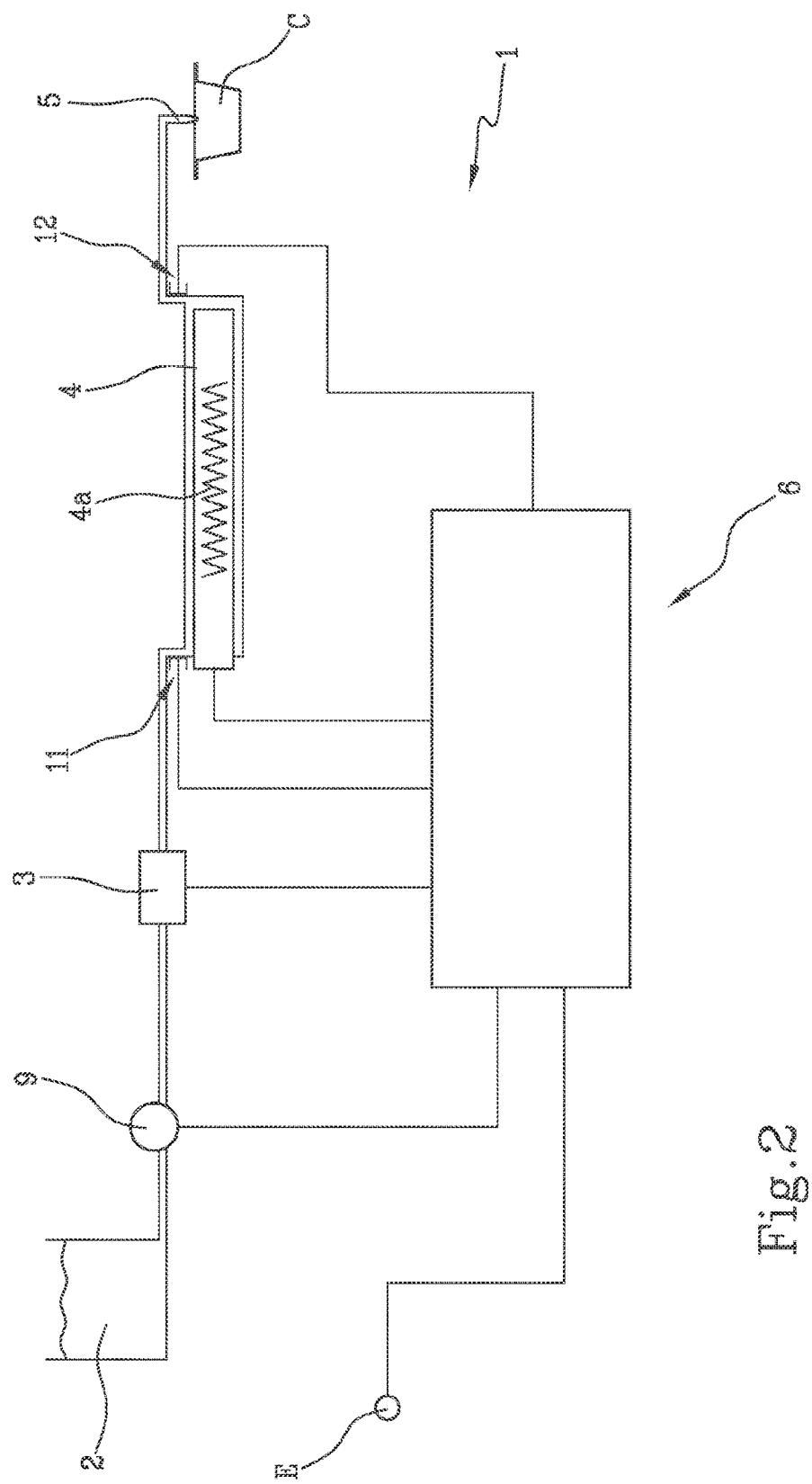
FIG. 2 is a schematic representation of a different configuration of components of a dispensing device which are able to process the control method according to the invention.

With reference to FIG. 1, the numeral 1 denotes in its entirety a device for dispensing hot fluid for food products which, for simplicity of description, will hereafter be referred to as dispensing machine 1.

These food products may be of the loose type or, for example, as shown in the accompanying drawings, contained in extraction pods or capsules "C" for preparing hot beverages such as coffee, tea, herbal tea and the like. In other words, the term extraction capsules "C" is used to mean, hereinafter, any generic type of capsule or dispenser or dispensing unit where the substance in powder, granular and similar form is placed.

Therefore, the term "extraction capsules "C" in this case means always any generic type of capsule or dispenser or dispensing unit where the substance is placed in powder form, etc. for making hot beverages such as coffee, tea, herbal tea and the like.

Similarly, it should be noted that a boiler or heat exchanger and relative heating element with circular sections will be repeatedly named and illustrated by way of example only and without restricting the scope of the invention, since they, individually or both, may also have any other profile (oval, flattened, etc.).

Moreover, the heating element must not necessarily be considered as single but may also consist of several elements suitably positioned and sized.

The control method for dispensing hot water (in this case, for simplicity of description, it will be limited to only water) according to the example of the invention is therefore performed in a dispensing device 1 or dispensing machine 1, such as, for example, that shown in FIG. 1.

As illustrated, the fluid dispensing device 1 comprises at least:
  a power supply source (E);
  a source of fluid 2 to be heated;
  a feed unit 3 configured for picking up the fluid to be heated;
  a boiler or heat exchanger 4;
  a dispensing device 5 configured for dispensing the hot fluid;
  a data control and processing system (6).

By way of a non-limiting example of the embodiment illustrated, there may be:
  the power supply source E which may be electricity;
  the source of fluid to be heated which may be a tank 2 for containing the fluid;
  the feed unit which may be a pump 3.

The control method comprises measuring external operational variables of the dispensing device 1.

As described in more detail below, the measurement is obtained with suitable measuring units which are able to send relative signals to a control unit 6.

The control unit 6 is configured to receive the signals of the measuring units and to perform cyclical calculations for optimising the control of the components of the device (described in more detail below) as a function of the values measured.

The control unit 6 stores the wanted or desired temperatures at the output, that is, the reference temperature value.

In other words, the control method comprises measuring all those parameters which, during use of the dispensing machine 1 and therefore during dispensing of the hot water, influence the obtaining of the desired hot drink.

As illustrated, the control and adjustment steps are performed by the control and processing system 6 in the following manner:

A measurement of inlet parameters comprising at least an available inlet power value and an inlet temperature of the fluid towards the boiler or heat exchanger 4.

A cyclical calculation of a quantity of heat which must supply the boiler or heat exchanger 4 and/or a flow rate of fluid dispensed.

A consequent adjustment of the value of heat generated by the boiler or heat exchanger 4 and/or the quantity of fluid dispensed, as a function of the measurements of the inlet parameters and of a wanted or desired value of outlet temperature of the fluid.

All the measurement, cyclical calculation and adjustment steps are performed simultaneously and in real time during a step of dispensing fluid by the dispensing device 5.

Preferably, the measuring step is performed by measuring a flow of the water whilst it is dispensed by the dispensing device 1.

In other words, the method comprises measuring a flow rate of the water drawn from a source of fluid, such as, for example, a tank 2, of the dispensing machine 1 during the entire dispensing.

Preferably, the measuring step is performed by measuring a mains voltage which supplies the dispensing device 1.

In other words, the method comprises measuring the electricity supply of a pump 3 configured for drawing water from the tank 2 and/or of a boiler or heat exchanger 4 configured for heating the water drawn by the pump 3.

It should be noted that the pump 3 and the boiler or heat exchanger 4 are connected to and driven by the control unit 6.

Preferably, the measuring step is performed by measuring a temperature of the water entering and, if necessary, just for checking purposes, also flowing out from the boiler or heat exchanger 4 of the dispensing machine 1.

Preferably, the measuring step is performed by measuring a combination of the above-mentioned operating parameters of the machine described above.

A preferred embodiment of the control method comprises measuring the three operating parameters described above.

More specifically, the measuring step is preferably performed by measuring the flow of water dispensed by the dispensing machine 1, the mains voltage of the dispensing machine 1 and the temperature of the water entering, and, if necessary, just for checking purposes, also at the outlet from the boiler or heat exchanger 4 of the dispensing machine 1.

The measuring step is performed continuously in real time during the entire period of operation of the dispensing machine 1, that is, during dispensing of the hot drink by the dispensing machine 1.

At the same time as the measuring step, there is, through the control unit 6, a step for cyclically calculating the variable heating control parameters (boiler or heat exchanger) and/or of the pump which will be constantly updated and optimised as a function of the signals relating to the measurements taken.

In this way, it is possible to maintain the temperature and/or flow rate of the hot water at the required reference values (typical of the specific drink to be made).

Preferably, the adjustment of the heat supplied by the boiler or heat exchanger 4 is performed by varying the quantity of heat released by an electrical resistance 4a of the boiler or heat exchanger between a minimum quantity of heat and a maximum quantity of heat.

The terms minimum heat and maximum heat refers to the quantities of heat which can be emitted by the boiler or heat exchanger 4 (that is o say, by the resistor 4a) with a zero electricity supply and a full power supply of the boiler or heat exchanger 4.

In other words, by varying the parameters of the supply voltage (and/or current) of the boiler or heat exchanger 4 it is possible to continuously vary the heat emitted by them to heat the water passing through it.

Preferably, the method may comprise a step of switching off the boiler or heat exchanger 4 in advance before the end of dispensing.

Advantageously, this solution allows a recovery of the energy, which is proportionally not negligible, accumulated inside the heat exchanger and any capsule or powder or dispensing compartment, also with the consequent cooling, practically instantaneous, of the heat exchanger which prevents the formation of limescale during the natural spontaneous cooling time which would be much longer. Preferably, the adjustment of the water flow rate is achieved by varying the flow rate of the pump 3 of the dispensing machine 1 between a maximum flow rate value and a minimum flow rate value.

The expressions minimum flow rate value (which may be 0) and maximum flow rate value mean the flow rate values which the pump 3 may draw from the tank 2 as a function of a minimum value (which may be 0) and a maximum value of the electricity supply to the pump 3.

In other words, by varying the parameters of the voltage (and/or current) supplied to the pump 3 it is possible to obtain the calculated and desired flow rate value in order to obtain the best dispensing conditions.

Advantageously, by using a heat exchanger with very low thermal inertia, this solution makes it possible to obtain a variation in the temperature with any curve of desired trend to optimise the characteristics of the drink obtained.

The adjustment step is performed continuously in real time during the entire operating period of the dispensing machine 1, that is to say, during dispensing of the hot beverage by the dispensing machine 1, following its continuous re-calculation and updating on the basis of the external parameters read continuously and always in real time.

The measurement, calculation and adjustment steps are therefore performed simultaneously during the entire dispensing of the hot water by the dispensing machine.

In other words, the control method continuously monitors the external parameters in which the machine operates and calculates and instantaneously adjusts the dispensing conditions of the machine in order to guarantee that the required reference temperature is always and in any case maintained.

In use, a predetermined flow rate of water (and/or vice versa) will be necessary for a predetermined quantity of heat in order to obtain the desired outlet temperature of the water.

For example, for a resistor 4a of 50 Ohms which therefore delivers 968 W at the nominal voltage of 220 V, in order to have an outlet temperature of 90° C. —starting from an inlet temperature of water into the boiler or heat exchanger of 20° C. —a flow of water of 3.308 c.c./second will be necessary. If the mains voltage drops to 201 V, the method would be able to promptly respond, bringing the water flow rate to 3.014 c.c./second without a minimum variation in keeping the temperature at 90° C.

If, on the other hand, for example, the pump now fed to the maximum extent was no longer able, due to an increase in the outlet counterpressure, to supply the 3.308 c.c./second planned but only 2.5 c.c./second then the method would immediately calculate and reduce the power supplied to the boiler or the heat exchanger 4 bringing it to 731.5 W, limiting the voltage applied to the boiler or heat exchanger 4 to 191.180 V, again preventing, also in this case, variations in the outlet temperature of 90° C.

As mentioned above, these calculations are performed instantaneously and the method therefore allows the dispensing machine 1 to react equally quickly in the case of sudden variations in the operating parameters.

Preferably, the method also comprises a step of calculating a preheating time of the dispensing machine as a function of the operating parameters measured at the start-up of the dispensing machine 1.

Moreover, the method comprises adjusting the initial operating parameters in order to optimise the preheating time.

More specifically, in the case of using special heat exchangers with an extremely low thermal inertia, otherwise not manageable with traditional methods, the method makes it possible to advantageously obtain a dispensing machine 1 always ready for use whilst even starting from cold, in light of the extremely reduced heating step (which may, for example, be in the order of only two seconds). For this reason, the method, as well as minimising the energy lost for bringing the system to the desired temperature, is able to avoid keeping the dispensing machine 1 in stand-by mode, at the desired temperature, with further waste of energy which is anything but negligible as in the prior art conventional systems.

Moreover, the system, upon completion of the dispensing, is configured to avoid any form of stand-by state wherein there would still be a low energy consumption.

In fact, after dispensing has been completed, the system can immediately move to a state of zero consumption until reaching the request for subsequent dispensing.

This subsequent dispensing request re-activates the dispensing device in a steady state operating condition, that is to say, the system is already immediately ready to start a dispensing cycle.

The current embodiments, on the other hand, all have an off-load, uninterrupted, consumption, which is close to the half a Watt, which constitutes the limit allowed by the current regulations and which, considering 24 hours a day 365 days a year, constitutes a further waste of overall energy which is not negligible.

Further, in view of the extreme response speed of the system, it also allows the initial preheating to be extended, by a second, therefore bringing, in the example, to 3 total seconds before starting the dispensing.

This allows the production of a small quantity of initial steam with two main advantages:
- the steam is immediately diffused in the entire soluble powder or product of the respective drink and, condensing, preheats it quickly and uniformly at the desired temperature allowing even very small doses to be dispensed at the same temperature as the longer ones, also with a more effective extraction, since it starts immediately with the correct temperature;
- the quantity of fluid absorbed by the small particles of limescale, which may be slowly and continuously forming, when vaporising, favours its detachment and disintegration, preventing accumulation even with the use of quite hard water, by which an effective anti-limescale effect is therefore produced.

Advantageously, this result can be further improved with certain measures directly connected to the structure of the boiler or heat exchanger 4 (see also FIGS. 3, 3a, 3b, 3c, 3d, 3e), including:

the resistor 4a (or heater) of the boiler or heat exchanger 4 may be subjected to a specific non-stick treatment.

a generic outer containment pipe TCE (forming the tubular body of the heat exchanger 4) may similarly be subjected to a specific non-stick treatment.

the generic outer containment pipe TCE may be directly made of a material with natural or intrinsic non-stick properties (for example Teflon).

the outer containment pipe TCE may also comprise an inner spiral SP. This inner spiral SP, generating a certain degree of turbulence in the flow which flows there, may facilitate the detachment of any small particles being formed, in particular in the possible initial vaporisation.

The outer containment pipe TCE of FIG. 3 may comprise an inner part TCI (FIG. 3c) which is suitably soft and/or elastic (for example silicone) contained in a rigid pipe TR which is able to withstand the maximum planned operating pressures. Said inner wall is able to undergo small deformations and/or movements due both to the above-mentioned turbulences as well as the pressure pulsations generated by the pumps with the vibration of normal use.

Said inner soft and/or elastic wall may, rather than being in direct contact with the above-mentioned outer rigid pipe, be separated from this by a small suitable separating gap I (FIG. 3e) which can also allow a predetermined further mobility and/or expansion as a function of the above-mentioned turbulences and/or pressure pulsations.

FIG. 3d, on the other hand, comprises an intermediate solution where the gap I is only partial and the inner soft and/or elastic wall rests partly directly on the rigid pipe TR.

Preferably, the basic method may also comprise a step of initial calibration of the dispensing device 1.

The calibration step is performed to define a correction coefficient (if necessary, automatically updated periodically and without any urgency) to compensate for any minor deviations of the actual outlet temperature measured with respect to the expected and desired outlet temperature of the fluid flowing out.

The adjustment step is performed taking into account the correction coefficient. The calculation step will therefore be performed taking into account this coefficient, without, therefore, slowing down in any way the consequent adjustments planned.

It should be noted that the use of this coefficient, unlike traditional systems limited by the intrinsic delay of the temperature probes, does not result in any slowing down of the adjustments since it remains constant and typical of each individual machine, due mainly to the manufacturing tolerances of the various components of the system.

Advantageously, in light of what is described above, the method is able to keep constant under any condition of use the dispensing temperature of the hot fluid with the maximum precision.

Advantageously, the choice between the reduction of the heat emitted by the boiler or heat exchanger and/or the flow rate of the fluid of the pump (or the increase where necessary) is performed in a negligible time in light of the external operating parameters measured, before they can influence the result obtained, which, on the contrary, occurs in traditional systems which intervene after having noted a variation of the result. Preferably, the control method comprises a step of monitoring the fluid passing through a boiler or heat exchanger 4 of the dispensing device 1.

The monitoring step is performed in order to identify any degree of obstruction by limescale of the dispensing device 1. More specifically, the monitoring step is performed to identify any degree of obstruction of the heat exchanger 4.

If a value of the degree of obstruction is greater than a threshold value, the method comprises a step of signalling to a user the need to perform a limescale removal of the dispensing device 1.

In other words, the degree of obstruction is defined by the quantity of limescale accumulated in the heat exchanger 4 which is considered dangerous by the method, that is to say, by a control unit of the machine (which therefore requires a limescale removal signalled to the user) if, in the simplest case, it identifies a value greater than the above-mentioned threshold value.

If, on the other hand, the degree of obstruction were below the threshold value, the dispensing device 1 would continue to operate normally.

Preferably, the monitoring step is performed by measuring a pressure difference of the fluid between an inlet section and an outlet section of the boiler or heat exchanger 4.

This pressure difference is therefore compared with a reference value (in the absence of lime during the passage in the heat exchanger 4 it is normal that there may be a small pressure difference between inlet and outlet).

The degree of obstruction described above is proportional to the difference between the measured value of the resulting pressure difference measured and the reference value.

When limescale continues to be formed, the water passage sections reduce proportionally, causing a progressive increase in the pressure difference between the inlet and outlet of the heat exchanger 4 (in the absence of limescale, the reference values are generally negligible due to the low resistance to the passage of the water in the heat exchanger 4).

In other words, the pressure difference varies with the variation of the deposits generated by the limescale and is converted into a corresponding signal which will therefore increase with the increase in the formation of new deposits (or reduce as the latter decreases if limescale removal cycles are performed).

As already mentioned, in order to highlight the above-mentioned pressure differences the heat exchanger 4 can be preferably made according to the embodiment illustrated in FIG. 3.

Here, the outer containment pipe TCE comprises a relative inner wall touched by the fluid to be heated having a groove (that is, not smooth) and separated by a predetermined distance of separation DS from the heater R which is quite contained (for example, about one millimetre or less) in such a way as to form a rectilinear passage section, between inlet and outlet, of the fluid in the heat exchanger.

This transit section (made with said predetermined distance DS) therefore allows the fluid, in the absence of limescale as illustrated in FIG. 3a, to pass through the heat exchanger 4 following the shortest route between inlet and outlet, passing directly from one spiral to the other through the section left free by this distance DS, with an approximately rectilinear movement, as if the spiral groove did not exist.

In these conditions the corresponding pressure jump between inlet and outlet will be very low.

As, on the other hand, illustrated in FIG. 3b, as the formation of the limescale FC continues, the fluid flow, finding this direct passage increasingly obstructed, will be forced to pass through the spiral-shaped groove, to an ever greater extent, until reaching the extreme case in which it can flow exclusively inside it (see the relative arrows).

In these conditions, both for a much smaller transit section since limited only to the inside of the groove and for a spiral route much longer than the previous straight line, the pressure jump may be significant and therefore very easy to detect and/or measure and/or control.

It should be noted that even reaching this extreme situation the heat exchanger will still be perfectly passed through by the suitable limescale removal liquids which, moreover, must dissolve perfectly accessible at any point.

The above-mentioned feature therefore allows, for the same results which can be obtained, less sensitive and sophisticated detection sensors and/or systems to be used, thus increasing the containment of the costs, the simplicity and reliability of the detection and the consequent limescale removal.

It should be noted that an intermediate solution might also be preferred, using several grooves with a longer spiralling step until reaching the limit of a rectilinear trend instead of spiralling.

The advantage would be progressively less, with a greater constructional simplicity.

Preferably, the method may also comprise a step of locking the dispensing device 1 in such a way as to avoid exceeding a predetermined maximum value of the degree of obstruction.

In other words, following repeated signalling steps the method may comprise a block of the dispensing device 1 until the user carries out a limescale removal.

Preferably, the method may also comprise a step of identifying false limescale removal of the dispensing device. This step therefore also comprises, after the above-mentioned block of the dispensing device 1, a block of the limescale removal procedure following a predetermined number of monitoring operations identifying false limescale removal attempts by the user.

In other words, if a user were to use an ineffective limescale removal product, or, on the other hand, decided to "trick" the dispensing device 1, leaving water to circulate without limescale removal product, the method would be able to identify that after the planned signals there is still the same degree of obstruction (if not greater) and to take into account the number of times in which this phenomenon occurred. After exceeding a predetermined number of attempts which have occurred without success and/or with a worsening of the degree of obstruction detected, the method could therefore prevent further attempts to avoid reaching a possible total occlusion. In this way, if the machine were to enter a maintenance status it would be possible to understand with certainty, by simply observing this total block, that inadequate maintenance has been carried out by the user.

Consequently, the maintenance may be limited to removing, possibly by simply providing a sequence of commands unknown to the public, the blocking of the limescale removal cycles which can be performed again in the correct manner in the maintenance operation itself, without involving any additional costs for disassembling and replacing components.

The invention also relates to a dispensing device 1 which comprises the above-mentioned fluid tank 2, the pump 3 configured for drawing fluid from the tank 2, the boiler or heat exchanger 4 configured for heating the fluid drawn by the pump 3 and the nozzle 5 configured for dispensing the heated fluid from the boiler or heat exchanger 4.

The dispensing device or machine 1 also comprises a control system 6 configured for implementing a control method as described above.

The term "control system 6" means all those hardware and software components (that is, the control electronics) which allow the method described above to be implemented.

In other words, the term "control system 6" means that set of sensors, processors and programs used for immediately assessing, in real time, which parameters of the dispensing device 1 to modify as a function of the input or external operating parameters measured.

For this reason, the control system 6 comprises a control unit 7 connected to the various components of the dispensing machine 1 for performing the method described above.

Preferably, the control system 6 comprises a first temperature probe 8a positioned close to the inlet of the boiler or heat exchanger 4.

Preferably, the control system comprises a second temperature probe 8b positioned close to the outlet of the boiler or heat exchanger 4.

Preferably, the first temperature probe 8a is located outside the boiler or heat exchanger 4, but very close to the inlet of the boiler or heat exchanger 4.

Alternatively, the first temperature probe 8a may be applied inside the boiler or heat exchanger 4.

Similarly, alternatively, the second temperature probe 8b may also be applied to the inside of the boiler or heat exchanger 4.

Preferably, the first temperature probe 8a and, if any, the second temperature probe 8b are configured to measure, respectively, an inlet temperature of the fluid (towards the boiler or heat exchanger 4) and an outlet temperature of the fluid from the boiler or heat exchanger 4.

In this way, the control system 6 (that is, the control unit 7) is able to calculate the quantity of heat that must be released from the boiler or heat exchanger 4, whilst also keeping any calibration coefficient introduced updated, by reading the probe 8b.

Preferably, the control system 6 comprises a turbine 9, preferably positioned between the tank 2 and the boiler or heat exchanger 4.

The turbine 9 is configured to measure (in a precise, immediate and continuous manner) the actual flow rate of fluid drawn by the pump 3 (drawing it, in the example, from the tank 2) and fed to the boiler or heat exchanger 4. As shown for example in FIG. 1, the turbine 9 is positioned between the tank 2 and the pump 3.

The control system 6 (that is, the control unit 7) is, as for example shown in FIG. 1, also connected to an electricity supply "E" and is configured for checking and measuring the mains voltage.

Moreover, the control system 6, connected to an electricity mains and, by means of suitable control devices 10a and 10b is able to suitably and immediately vary the energy supplied respectively to the pump 3 and/or to the boiler or heat exchanger 4 (that is to say, to the resistor 4a).

Preferably, the control system 6 comprises a first pressure sensor 11 and a second pressure sensor 12 respectively positioned in the inlet and outlet section of the heat exchanger 4 in order to monitor the pressures of the fluid passing through the boiler or heat exchanger 4.

Alternatively, the monitoring may be performed with a single differential pressure sensor connected to the inlet and outlet sections of the heat exchanger 4.

The pressure difference is in any case linked in proportion to the flow rate of the fluid which passes through the heat exchanger 4.

Therefore, in order to have a correct value of the degree of obstruction it is necessary to divide the pressure jump by the flow rate of the fluid measured.

Preferably, the monitoring step is performed by measuring, in a short initial step of the dispensing, the inlet pressure of the fluid into the heat exchanger 4 and comparing the value with a reference value of the inlet pressure.

In fact, during the initial steps, the fluid which passes through the food powder still dry will not find any significant resistance, making it unnecessary to measure the outfeed pressure since it will be close to 0; it will therefore be convenient, for example, to use a single pressure sensor in the inlet section of the heat exchanger 4.

According to a different embodiment and, advantageously, the monitoring in the above-mentioned initial dispensing step may be performed by comparing a real performance of a unit for feeding the fluid, such as, for example, a pump 3, with reference performances of the pump 3, preferably used at reduced and stabilised performance levels.

In fact, a specific pump 3 may have, as a function of the energy with which it is supplied, a well determined dispensing curve on the basis of which the flow rate of liquid supplied starts from a maximum value when there is no counterpressure flowing out to gradually fall to 0 when reaching the maximum pressure which it is able to dispense in these supply conditions.

In other words, the monitoring is performed on the basis of the counterpressure which can be calculated, as the dispensing curve from the pump 3 is known, as a function of the flow rate of the fluid:

since a measuring device is interposed between the pump 3 and the tank 2, that is to say, for example, a turbine 9, which is able to quantify the fluid supplied to the pump 3, the turbine 9 can equally measure the speed and therefore, in parallel, the above-mentioned flow rate.

In other words, if there are no encrustations, the initial dispensing will occur at practically zero counterpressure and, consequently, at the maximum speed or flow rate planned in those conditions; on the other hand, the presence and the increase in limescale formations, causing a progressive increase in the counterpressure downstream of the pump, will cause a corresponding gradual reduction in the speed or flow rate measured by the turbine 9 which will therefore provide the corresponding degree of obstruction of the dispensing system.

Overall, the control system 6 is able to perform the method described above with the aid of the components described which make it possible to obtain an immediate control, in real time and in every possible operating condition, of the operating parameters of the entire device.

Moreover, by means of the control unit 7, the control system 6 is able, starting from the desired reference parameters, to adjust quickly and in real time (preferably during the entire dispensing of the fluid) the parameters to be modified in order to keep constant and/or suitably vary the temperature and/or the outlet flow of the fluid so as to obtain an optimised hot drink, with the characteristics required.

Advantageously, the invention makes it possible to precisely adjust the parameters of the dispensing device 1 in such a way as to keep the outlet temperature of the hot fluid constant.

Advantageously, the invention makes it possible to precisely adjust the parameters of the dispensing device 1 in such a way as to suitably vary the outlet temperature of the hot fluid, even during dispensing.

Advantageously, the invention makes it possible to precisely adjust the parameters of the dispensing device 1 in such a way as to keep the outlet flow of the hot fluid constant.

Advantageously, the invention makes it possible to precisely adjust the parameters of the dispensing device 1 in such a way as to suitably vary the outlet flow of the hot fluid, even during dispensing.

Advantageously, the invention allows a saving to be obtained in terms of energy consumption.

Advantageously, the invention provides an effective protection against damage from the formation of limescale.

Advantageously, the invention makes it possible to avoid damage or undesired deterioration of the capsule "C" and/or of the food powder used and/or of the dispensing machine 1.

The invention claimed is:

1. A control method for dispensing a hot fluid in a fluid dispensing device comprising at least:
    a power supply source;
    a source of fluid to be heated;
    a feed unit configured for picking up the fluid to be heated;
    a boiler or heat exchanger;
    a dispensing device configured for dispensing the hot fluid;
    a data control and processing system,
    the following steps actuated by the data control and processing system:
        a measurement of inlet parameters comprising at least an inlet power value and an inlet temperature of the fluid towards the boiler or heat exchanger;
        a cyclical calculation of a quantity of heat generated which must supply the boiler or heat exchanger and/or a quantity of fluid dispensed;
        consequent adjustment of a value of heat generated by the boiler or heat exchanger and/or the quantity of fluid dispensed, as a function of the measurements of the inlet parameters and of a wanted or desired outlet temperature of the fluid;
        the measurement, cyclical calculation and adjustment steps being performed simultaneously and in real time during a step of dispensing the fluid by the dispensing device.

2. The control method according to claim 1, wherein said measurement step is performed by measuring:
    a quantity of the fluid dispensed by the dispensing device; and/or
    a value of energy available at the inlet of the dispensing device; and
    the temperature of the fluid entering said boiler or heat exchanger.

3. The control method according to claim 1, wherein the measurement step is performed by also measuring an outlet temperature of the fluid from said boiler or heat exchanger.

4. The control method according to claim 1, also comprising a step of calibrating the dispensing device to define a correction coefficient, cyclically updated, taking into account the wanted or desired outlet temperature of the fluid and a measured actual outlet temperature value of the fluid, said adjustment step being performed taking into account said correction coefficient.

5. The control method according to claim 1, wherein said adjustment step comprises an advance switching off of the boiler or heat exchanger before an end of the dispensing.

6. The control method according to claim 1, wherein said adjustment of the heat supplied by the boiler or heat exchanger is performed by varying a quantity of heat released by an electrical resistance of the boiler or heat exchanger between a minimum quantity of heat and a maximum quantity of heat; said step of varying the quantity of heat being performed by varying a supply voltage and/or a current.

7. The control method according to claim 1, wherein an adjustment of a flow rate of the fluid dispensed is performed by varying a flow rate of the feed unit of said dispensing device between a maximum flow rate value and a minimum flow rate value; said step of varying the flow rate being performed by varying a supply voltage and/or a current.

8. The control method according to claim 7, wherein said step of varying the flow rate is performed by varying the supply voltage and/or the current of an electric pump defining the feed unit.

9. The control method according to claim 1, also comprising a step of calculating a pre-heating time of the dispensing device as a function of initial input and operating parameters measured at a start of said dispensing device and adjusting said initial input and operating parameters in order to optimise the pre-heating time.

10. The control method according to claim 9, wherein said step of calculating the pre-heating time comprises an extension for a further predetermined time to generate a predetermined quantity of steam, the quantity of steam useful both for pre-heating a food powder and for preventing, or at least limiting, formation of limescale.

11. A dispensing device for dispensing a hot fluid comprising:
- a power supply source;
- a source of fluid to be heated;
- a feed unit configured to supply the fluid to be heated to a boiler or heat exchanger;
- a dispensing device configured for dispensing the heated fluid from the boiler or heat exchanger;
- a data control and processing system configured for performing:
  - a measurement of inlet parameters comprising at least an inlet power value and an inlet temperature of the fluid towards the boiler or heat exchanger;
  - a cyclical calculation of a quantity of heat generated which must supply the boiler or heat exchanger and/or a quantity of fluid dispensed;
  - consequent adjustment of a value of heat generated by the boiler or heat exchanger and/or the quantity of fluid dispensed, as a function of the measurements of the inlet parameters and of a wanted or desired outlet temperature of the fluid;
- the measurement, cyclical calculation and adjustment steps being performed simultaneously and in real time during a step of dispensing the fluid by the dispensing device.

12. The dispensing device according to claim 11, wherein said data control and processing system comprises a first temperature probe positioned close to an inlet of the boiler or heat exchanger; said first temperature probe being configured to measure the inlet temperature of the fluid into the boiler or heat exchanger.

13. The dispensing device according to claim 12, wherein said control system comprises a second temperature probe positioned close to an outlet of the boiler or heat exchanger, said second temperature probe being configured to measure an actual outlet temperature of the fluid from the boiler or heat exchanger.

14. The dispensing device according to claim 11, wherein said control system comprises a measuring device or turbine configured for measuring an actual flow rate of the fluid fed to the boiler or heat exchanger.

15. The dispensing device according to claim 11, wherein said control system is also connected to the power supply source and is configured for measuring a relative voltage.

16. The dispensing device according to claim 11, wherein said boiler or heat exchanger is made of a material which is non-stick to limescale and/or has been treated with a limescale non-stick treatment.

17. The dispensing device according to claim 11, wherein said boiler or heat exchanger comprises an outer tubular body or outer containment pipe having an inner surface having a predetermined inner spiral surface.

18. The dispensing device according to claim 11, wherein said boiler or heat exchanger comprises an outer tubular body or outer containment pipe; said outer tubular body or outer containment pipe being divided into an enclosed soft and/or elastic inner part, directly in contact or through a separating gap with a rigid outer part.

* * * * *